Dec. 18, 1945.    E. J. CONRAD    2,391,134
PISTON RING
Filed March 28, 1942
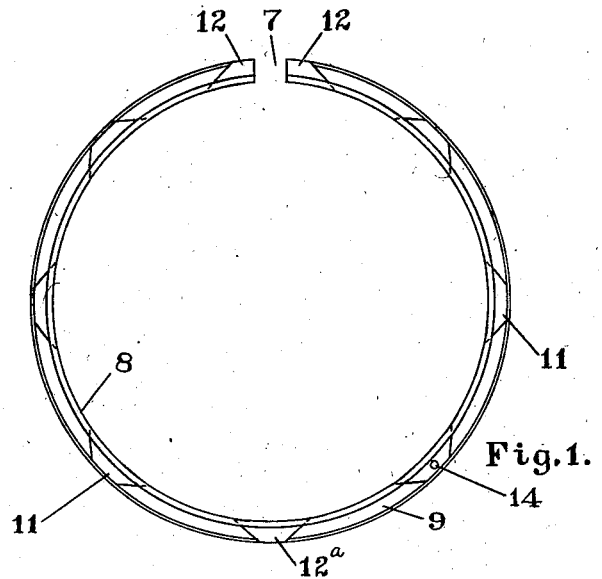
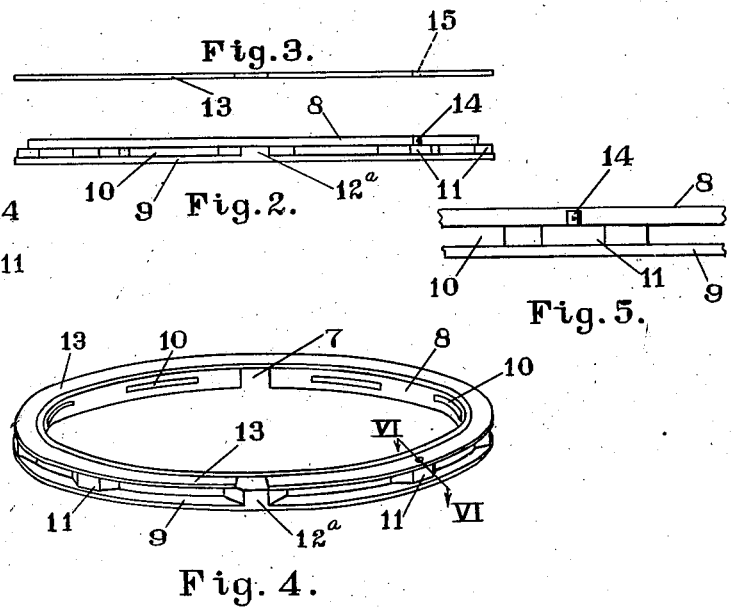
Inventor
EUGENE J. CONRAD Patented Dec. 18, 1945

2,391,134

UNITED STATES PATENT OFFICE 2,391,134

PISTON RING

Eugene J. Conrad, Columbus, Ohio

Application March 28, 1942, Serial No. 436,689

1 Claim. (Cl. 309—45)

This invention relates to piston rings and is especially useful in oil control when employed in internal combustion engines.

An object of the invention is to provide an improved construction of such ring in two parts one of which, called the base ring, in combination with a top or pressure ring restricts the access of oil to the wall of the cylinder just sufficiently and properly to lubricate that wall above the top ring and while the two together are so lapped as to close the gap in each as to prevent the blowby or passage of the hot gases of the explosion from entering the oil body below.

Other objects will appear from the following description.

The base ring generally speaking is of right angle cross section but provided with means for receiving and supporting the top ring which latter is plain. The inner vertical side of the base ring is cylindric and is provided with a series of openings or slots for the passage of lubricant while the horizontal wall is provided with seats between the said slots and at its ends for supporting the top ring on the outer side of the cylindric extension of the base ring. Both rings are split, and means are provided to connect the rings together to prevent annular rotation of either with respect to the other and so that the split in each is covered by a closing portion of the other. Both rings are of suitable resilient metal but it is my purpose to make the base ring more powerful in its expansive character so that it will act to keep the top ring in close contact with the cylinder wall of the engine.

In the accompanying drawing illustrating a preferred example of the invention—

Figure 1 is a plan view of the upper side of the base ring.

Fig. 2 is an edge view of the base ring.

Fig. 3 is an edge view of the top ring.

Fig. 4 is a perspective view of the assembled rings.

Fig. 5 is a detail view on a larger scale of portions of the base and top rings showing a modification of the pin for connection between the rings.

Fig. 6 is a cross section on an enlarged scale on the line VI—VI of the Fig. 4 illustrating in connection therewith sections of a cylinder and piston.

The base ring which as before stated is a transversely split one as shown at 7 is preferably of cast metal and resilient in its plane. The said base ring is generally of right angled form in its cross section, that is to say, it has a vertical inner cylindrical wall 8 with a horizontal wall 9 extending outward from the lower portion of the said inner cylindrical wall. The said inner wall has in it a series of spaced slots or openings 10. Formed on the upper side of said horizontal wall 9 between said slots 10 are seats 11 of tapered polyhedral form the upper surfaces of which lie in a place sufficiently below the top rim of the cylindric wall 8 to form supports for the top ring shown in Fig. 3. The outer ends or faces of the said seats 11 are shown as not coinciding with the rim of the horizontal wall 9 to permit distribution of the lubricant. In addition to the seats 11 there are seats 12 and 12 at the ends of that ring, said seats 12 and 12 extending to coincide with the rim of the horizontal wall 9, as does also the single seat 12ª which supports and maintains the two ends of the top ring shown in Fig. 3 in the plane of the rest of that ring.

The top or pressed ribbon ring as indicated at 13 is also a split one as shown in Figs. 3 and 4. Said top ring is of plain flat form of suitable spring steel or other suitable metal and is designed to fit around the outer side of the cylindric portion of the base ring and removably engage the base ring by means of a pin 14 on one of the seats 11 entered into a hole 15 in the top ring. When the top ring is thick enough, as if in a large construction, the seat for the pin 14 can be made as a socket as clearly shown in Fig. 6. The locations of the pin 14 and hole 15 in the respective rings are such that the gap in each ring is covered by a closing portion of the other ring.

Any suitable metal can be employed of which to manufacture the rings, and the two rings can be made of different metals having proper resilient and wearing qualities, but I contemplate that the base ring should be of more powerful resilience so that it shall expand the top ring into close contact with the cylinder wall.

When installed in a piston the thin top ring forms the demarkation line between the compression chamber and supply of the lubricant below. The slots in the base or oil ring allow excess of lubricant to escape to and from the wall of the cylinder and the top ring cuts down the film of oil for proper lubrication above the oil ring. The base ring keeps the top ring from snapping into the port area and conversely the top ring keeps the base ring from snapping into the ports of the cylinder wall in a two-cycle engine.

By reason of my construction the lower ring can be the expansion ring to press out the upper ring which is contracted in the construction shown. As shown in the drawing the rings are somewhat expanded but will be closed or approximately closed when installed in the piston and cylinder. In practice the upper ring is contracted in a two-cycle engine and expanded where used in a four-cycle engine. However where desired the contracted ring can be used in a four-cycle engine.

The upper ring can be made in different thicknesses according to conditions as, for example, in fitting oversize grooves. Such upper rings can therefore be kept in stock by dealers in various forms and sizes to supply the public demand. In other words the lower ring is adapted to receive an upper ring of a variety of dimensions as to thickness.

The rings herein shown and described can be used in the same piston with other forms of rings.

A ring according to the invention can be employed in various sorts of pumps.

The forms of the parts and position of the structure in practice can be changed without departing from the gist of the invention as claimed.

What I claim is:

A two part piston ring of metal for a combustion engine, said ring composed of a transversely split one piece base pressure ring having a substantially cylindric interior wall and an annular external projection therefrom of less height than said cylindric wall, said external projection having integral therewith spaced seats with lubricant passages between them extending through the said cylindric interior of said base ring, and a plain flat split ribbon ring of metal removably and expansibly fitting on the exterior of the cylindric portion of said base ring above and resting on said seats of the base ring, and means engaging both said rings for holding them from rotation with respect to each other with the transverse gap in each ring closed by the other ring.

EUGENE J. CONRAD.